3,346,808
APPARATUS INCLUDING CAPACITANCE MEANS FOR MEASURING IONIZATION IN HIGH VOLTAGE CABLES UNDER CONDITIONS OF HEAVY EXTERNAL INTERFERENCE
George Bader, Metuchen, N.J., assignor to General Cable Corporation, New York, N.Y., a corporation of New Jersey
Filed Sept. 25, 1963, Ser. No. 311,470
3 Claims. (Cl. 324—54)

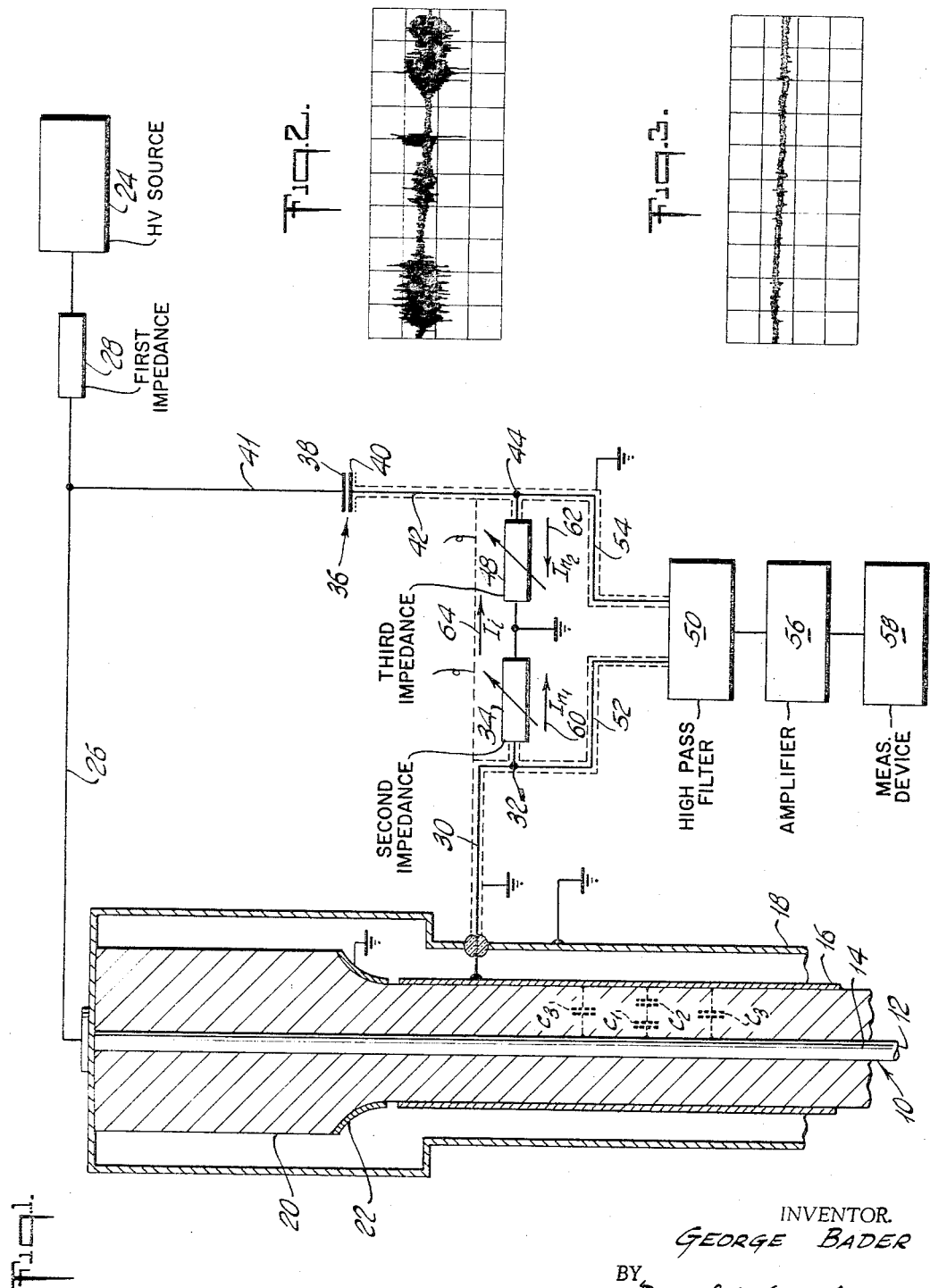

This invention relates to an improved method and apparatus for measuring of ionization in high voltage cables and, more particularly, relates to a method and apparatus for such measurement in which ionization occurring in the test equipment as distinguished from the ionization in the cable is cancelled thereby to permit clear display and measurement of the cable ionization.

The measurement of ionization in high voltage paper insulated power cables operated under either oil pressure or gas pressure is difficult because of the high voltages required for such ionization. At the high voltages which initiate ionization in the cable insulation, there is so much ionization developed in the supply transformers and the test equipment that the ionization in the cable insulation is completely obscured. The ionization occurring in the test equipment may be termed noise to distinguish it from the ionization in the cable insulation. In high voltage circuits as, for example, at 200 kilovolts or higher, the noise level is usually much higher than that of the ionization signals to be measured. Thus, the normal methods of measuring ionization such as the use of non-ionizing test equipment, the connection of test samples to the high voltage source through a low pass filter, the use of a tuned measuring circuit with a frequency different from the frequency of the prevailing noise or the reception of noise by an antenna and use of the received noise signal for cancellation are not capable of providing the desired measurement convenience and accuracy.

It is, therefore, an object of the present invention to provide an improved method and apparatus for the measurement of ionization in high voltage insulated cables in which the noise signal amplitude normally exceeds the ionization levels.

In accordance with this object, there is provided, in a preferred embodiment of this invention, a measurement arrangement in which the high voltage insulated cable is positioned in a grounded metal enclosure such as a pipe, which pipe is insulated from the cable shield. Stress cones are wound on each end of the cable and the shields thereof insulated from the shield and are grounded. The conductor of the cable is connected to a high voltage source through a first impedance. The cable shield is coupled through a concentric cable to one terminal of a second impedance, the other terminal of which is grounded. One terminal of the high voltage loss-free condenser is connected through said first impedance to the high voltage source and the other terminal of the condenser is connected by means of a concentric cable to one terminal of a third impedance, the other terminal of which is grounded. The second and third impedances are preferably variable. The signal caused by ionization in the cable insulation is tapped from the ungrounded terminals of the second and third impedances. The ionization current is supplied from the standard capacitor. Thus, the current flowing through the series combination of the second and third impedances are an accurate measure of the ionization current. After an ionization pulse, the cable capacitance and the standard capacitance is recharged from the voltage source. In this regard, however, the second and third impedances are coupled in parallel with the source and by suitable adjustment of the impedance magnitudes thereof, the noise generated in the high voltage supply will be cancelled out across the ungrounded terminals thereof.

Having briefly described this invention, it will be described in greater detail along with other objects and advantages in the following portions of the specification, which may best be understood by reference to the accompanying drawings, of which:

FIG. 1 is a schematic diagram of an ionization test circuit;

FIG. 2 is a plot of the trace on a cathode ray tube illustrating the effects of the presence of noise; and FIG. 3 is a plot of the oscillogram trace using the method and apparatus according to the present invention.

Referring to FIG. 1, there is shown a high voltage cable 10 having a central conductor 12, an insulation wall 14 such as paper wrapped insulation, and a shield 16 concentrically applied thereto. The cable 10 is placed within a metallic pipe 18 which is grounded and which is insulated from the cable shield 16. On the ends of the cable, stress cones 20 are applied, the shields 22 of which are insulated from the cable shield 16 and are grounded.

The conductor of the cable is connected to a high voltage source 24 through lead 26 and through a first impedance 28. The shield 16 of the cable is connected through a concentric cable 30 to one terminal 32 of a second impedance 34, the other terminal of which is grounded. A high voltage loss-free standard condenser 36 has plate 38 thereof coupled through lead 41 and the first impedance 28 to the high voltage source 24. Plate 40 is coupled through a concentric cable 42 to terminal 44 of a third impedance 48, the other terminal of which is grounded. The serially coupled second and third impedances 34 and 48 are coupled to a high pass filter 50 by concentric cables 52 and 54 respectively. The signal passed by the filter is indicative of the ionization current in the cable which is amplified by amplifier 56 and applied to a measuring device 58 which may, for example, be an oscilloscope, a volt meter, an ammeter, a wattmeter or a counter of ionization pulses depending on the parameter of ionization to be measured.

Any noise signals in the high voltage source or in the high voltage connections will produce currents $I_{n1}$ and $I_{n2}$ flowing through impedances 34 and 48 indicated by arrows 60 and 62. Since the noise signals are generated by a common source applied across both impedances 34 and 48, the voltage drop caused by the respective currents across the impedances 34 and 48 respectively can be made of equal magnitude by adjustment of the amplitudes of the respective impedances. Since terminals 32 and 44 are, therefore, maintained at the same instantaneous potential the voltage drop across terminals 32–44 caused by noise can be reduced to zero for practical measurement purposes. However, any ionization appearing in the cable will produce a current $I_1$ indicated by arrow 64 since the ionization current is supplied from capacitor 36. The ionization current causes a voltage drop across impedances 34 and 48 which are substantially in phase. Thus, this voltage caused by ionization currents appear across terminals 32–44 and can be measured or observed by the device 58.

When an oscilloscope is used as the measuring device, visual distinction between ionization pulses and noise pulses can be easily determined and the impedances adjusted for cancellation of the noise. For example, in FIG. 2, there is shown a typical oscillogram in which the noise blurring makes it impossible to observe the ionization in the cable. As the impedances 34 and 48 are varied, the amplitude of the ionization pulses will remain stable and very nearly constant, but the amplitude of the noise pulses will change markedly until the circuit is adjusted so as to compensate for noise as is shown in FIG. 3.

In FIG. 3, it can be noted that the noise is virtually completely eliminated and the small pips from the base line represent ionization discharges in the cable.

More specifically, the cable for the purposes of study of ionization may be represented by capacitance $C_1$ in series with a smaller capacitance $C_2$, the series combination being bypassed with a large capacitance $C_3$. The ionization process consists of (1) discharge of the capacitance $C_1$ by the ionization discharge, (2) equalization of the voltage between capacitance $C_3$ and $C_2$ and (3) delivery to the test sample of the charge. In many of the circuits known to the art, measurement of the current flow during the third step of the process is sufficient to indicate the ionization in the insulation. However, heavy interference or noise obscures the ionization currents.

In the present circuit, however, the test sample is charged from the capacitance 36. Subsequently, both the test sample and the capacitance 36 is recharged from the high voltage transformer. Because the high voltage transformer has a very high impedance with respect to the impedances 34 and 48, the time needed to charge the test sample from the capacitance 36 is much lower than the time needed to charge both the test sample and the capacitance 36 from the high voltage transformer. Thus, during charging of the test sample from the capacitance 36, the circuit may be considered as a measurement circuit in which the circuit proper is disconnected from the high voltage transformer. The current $I_i$ (64, FIG. 1) flowing to the test sample causes a voltage drop across the impedances 34 and 48 which may be measured between the terminals 32 and 44.

The noise voltage causes the current $I_{n1}$ and $I_{n2}$ to flow in opposite directions and in order to cancel the effects thereof, the response caused by current $I_{n1}$ at terminal 32 must be the same as the response at terminal 44 caused by current $I_{n2}$. Although the type of impedance does not vary this response, I have found it desirable to use for the impedances 34 and 48 inductances in parallel connection with resistances and capacitances, or to use only resistances in parallel connection with capacitances. Inductances in parallel connection with resistances and capacitances are preferred because in the series combination with capacitance of the capacitor 36 and the cable 10, the circuit serves as a filter for the line frequency and permits circuit oscillations which can be more easily observed on a low speed oscilloscope than short damped transients. However, at least one of the inductances of impedances 34 and 48 should be variable to permit balancing out of the noise.

The Q's (meaning $WL/R$) of both inductances should be the same. When the capacitance of the cable 10 is much higher than the capacitance of the standard condenser 36, the construction of such inductances becomes complicated. In this case, it is preferable to use only resistances and capacitances for impedances 36 and 48 and to use a high speed oscilloscope rather than a slow speed oscilloscope. By adjustment of the impedance magnitudes to satisfy the following Equations 1–3, compensation for all kinds of commonly encountered noise interference can be had enabling measurement of the ionization inception voltage on high voltage cable.

EQUATION 1

$$R_{10} \gg R_{34}$$

EQUATION 2

$$\frac{C_{10}}{C_{36}} = \frac{C_{34}+C_{30}+C_{52}+C_{16-18}}{C_{48}+C_{42}+C_{54}} = \frac{R_{48}}{R_{34}} = \frac{L_{48}}{L_{34}}$$

Where
$C_{30}$=capacitance of line 30
$C_{52}$=capacitance of line 52
$C_{16-18}$=capacitance between cable shield 16 and pipe 18, the total $C_{30}+C_{52}+C_{16-18}$ being the total stray capacitance in parallel with $C_{34}$
$C_{42}$=capacitance of line 42
$C_{54}$=capacitance of line 54, the total $C_{42}+C_{54}$ being the total stray capacitance in parallel with $C_{48}$

EQUATION 3

$$C_{10}R_{10} \gg (C_{34}+C_{30}+C_{52}+C_{16-18})R_{48}$$

The sensitivity of this method for ionization measurement is greater, the smaller are capacitances $C_{34}$ and $C_{48}$. Further, the deflection voltages for the oscilloscope beam is quite adequate. Typical values of the components utilized in the circuit of FIG. 1 are listed in Table I, which values are given for the purpose of complete disclosure, but not by way of limitation of the invention.

TABLE I

| Component | Type | Values |
| --- | --- | --- |
| $C_{36}$ | Capacitor, gas | 50–100 μμf. |
| $C_{10}$ | Capacitor, cable | 1,000–10,000 μμf. |
| $C_{34}$ | Capacitance of impedance 34 | 1,000 μμf.–0.2 μf. |
| $C_{48}$ | Capacitance of impedance 48 | 100–1,000 μμf. |
| $R_{34}$ | Resistance of impedance 34 | 100–200 ohms. |
| $R_{48}$ | Resistance of impedance 48 | 1,000–500,000 ohms. |
| $L_{34}$ | Inductance of impedance 34 | 0.1–0.5 mh. |
| $L_{48}$ | Inductance of impedance 48 | 1–100 mh. |

Other cable terminations may be used if they provide conditions which avoid discharges at the end of the cable shield. Similarly, instead of metal pipe, other types of metal shielding can be used if insulated from the cable shield. Although this disclosure has been cast in terms of ionization methods for cable, it can be used for ionization measurements in high voltage equipment other than cable.

This invention may be variously modified and embodied within the scope of the subjoined claims.

What is claimed is:

1. Apparatus for measuring ionization discharges in a length of high voltage cable having a conductor and insulator wall and a shield comprising a high voltage source of sufficient amplitude to initiate ionization discharges in said high voltage cable, said high voltage source containing noise due to internal ionization discharges, a grounded pipe enclosing said cable, a first impedance coupling the conductor of said cable to said high voltage source, a second impedance, means coupling one terminal of said second impedance to the shield of said cable, a third impedance, means including a high voltage capacitor and said first impedance for coupling one terminal of said third impedance to said high voltage source, means coupling the other terminals of said second and third impedances to ground, said second and third impedances each comprising a resistor and a capacitor coupled in parallel, said above recited impedances being dimensioned to make the following ratios equal: the capacitance of the cable to the capacitance of said high voltage capacitor; the capacitance of said second impedance and parallel stray capacitance to the capacitance of said third impedance and parallel stray capacitance; and the resistnce of said third impedance to the resistance of said second impedance, in order to cancel out noise signals generated in said high voltage source when measured between said one terminal of said respective second and third impedances, said high voltage capacitor supplying the energy for ionization discharges in said cable through the serial coupling of said second and third impedances to generate a voltage across said one terminal of said respective second and third impedances, the amplitude of which is related to the ionization discharge, and means for deriving measurement signals related to ionization discharges in said cable across said one terminal of said respective second and third impedances.

2. Apparatus in accordance with claim 1 in which said second and third impedances each include an inductance coupled in parallel with the respective capacitor and resistor.

3. Apparatus in accordance with claim 2 in which the ratio of the inductance of said third impedance to the inductance of said second impedance is equal to said recited ratios.

References Cited

UNITED STATES PATENTS

| | | | |
|---|---|---|---|
| 1,943,392 | 1/1934 | Paine et al. | 324—54 |
| 2,130,865 | 9/1938 | Watts et al. | 324—54 |
| 2,307,499 | 1/1943 | Frakes | 324—54 |
| 2,889,395 | 6/1959 | Frakes | 324—54 XR |
| 3,189,818 | 6/1965 | Frakes | 324—54 |

RUDOLPH V. ROLINEC, *Primary Examiner.*

WALTER L. CARLSON, *Examiner.*

G. R. STRECKER, *Assistant Examiner.*